US009283843B2

(12) United States Patent
Ziech (10) Patent No.: US 9,283,843 B2
(45) Date of Patent: Mar. 15, 2016

(54) TANDEM DRIVE AXLE SYSTEM WITH SIMPLIFIED REAR AXLE (71) Applicant: Dana Heavy Vehicle Systems Group, LLC, Maumee, OH (US)

(72) Inventor: James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 23 days.

(21) Appl. No.: 14/208,722

(22) Filed: Mar. 13, 2014

(65) Prior Publication Data

US 2014/0274538 A1    Sep. 18, 2014

Related U.S. Application Data (60) Provisional application No. 61/788,332, filed on Mar. 15, 2013.

(51) Int. Cl.
*B60K 17/36* (2006.01)
*B60K 23/08* (2006.01)
*F16D 11/00* (2006.01)

(52) U.S. Cl.
CPC .............. *B60K 17/36* (2013.01); *B60K 23/08* (2013.01); *F16D 2011/004* (2013.01); *F16D 2500/10425* (2013.01)

(58) Field of Classification Search
CPC ............................................. F16D 2500/10425
See application file for complete search history.

(56) References Cited

U.S. PATENT DOCUMENTS

| 1,975,208 | A |  | 10/1934 | Hastings et al. |
| 2,046,262 | A |  | 6/1936 | Grover |
| 2,144,359 | A |  | 1/1939 | Bryan |
| 4,046,210 | A |  | 9/1977 | Nelson |
| 5,711,389 | A |  | 1/1998 | Schlosser |
| 2006/0272866 | A1 |  | 12/2006 | Ziech |
| 2010/0248888 | A1 |  | 9/2010 | Hamperl et al. |
| 2013/0017927 | A1 | * | 1/2013 | Morscheck et al. ............ 477/35 |

* cited by examiner

*Primary Examiner* — Ramya Burgess
*Assistant Examiner* — Mark Manley
(74) *Attorney, Agent, or Firm* — Marshall & Melhorn, LLC (57) ABSTRACT A tandem axle system has a forward rear tandem axle and a rear rear tandem axle. A rear differential case, a first axle half shaft and a second axle half shaft extending from the differential case. The first axle half shaft has a first set of teeth and the second axle half shaft has a second set of teeth. The rear differential case has a set of teeth. A clutch collar is provided which has teeth on a surface. The teeth selectively engage with the first axle half shaft teeth and the second axle half shaft teeth. The teeth selectively engage with the teeth on the rear differential case.

11 Claims, 6 Drawing Sheets

TANDEM DRIVE AXLE SYSTEM WITH SIMPLIFIED REAR AXLE

BACKGROUND TO THE EXEMPLARY EMBODIMENTS

Typical North American trucks have a full time 6×4 driveline. A 6×4 driveline typically means that there are 6 wheels on the truck and 4 of the wheels on two axles are driven. It is also typical that 6×4 drivelines have an interaxle differential and may or may not have optional wheel differential locks. The 6×4 system offers good traction in most conditions but suffers from spin losses and gear mesh inefficiencies.

6×2 systems (systems that have 6 wheels with 2 of them driving on a single axle) can improve spin losses and gear mesh inefficiencies but these systems are limited on tractive effort due to the single drive axle. The 6×2 system can utilize a wheel differential lock and an ability to shift weight to the drive axle under low traction conditions to improve tractive effort but it cannot equal the performance of the 6×4 system traction.

The 6×2 tandem is lighter than the 6×4 axle tandem but the suspension attachment for the non-drive tag axle is neither the same design nor the same roll stiffness as compared to the 6×4 tandem. What is needed is a tandem axle system that has the efficiency and lighter weight of the 6×2 system with the tractive effort and suspension interface of the 6×4 system.

SUMMARY OF THE EXEMPLARY EMBODIMENTS

A tandem axle system has a forward rear tandem axle and a rear rear tandem axle. A rear differential case, a first axle half shaft and a second axle half shaft extending from the differential case. The first axle half shaft has a first set of teeth and the second axle half shaft has a second set of teeth. The rear differential case has a set of teeth. A clutch collar is provided which has teeth on a surface. The teeth selectively engage with the first axle half shaft teeth and the second axle half shaft teeth. The teeth selectively engage with the teeth on the rear differential case.

SUMMARY OF THE FIGURES

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
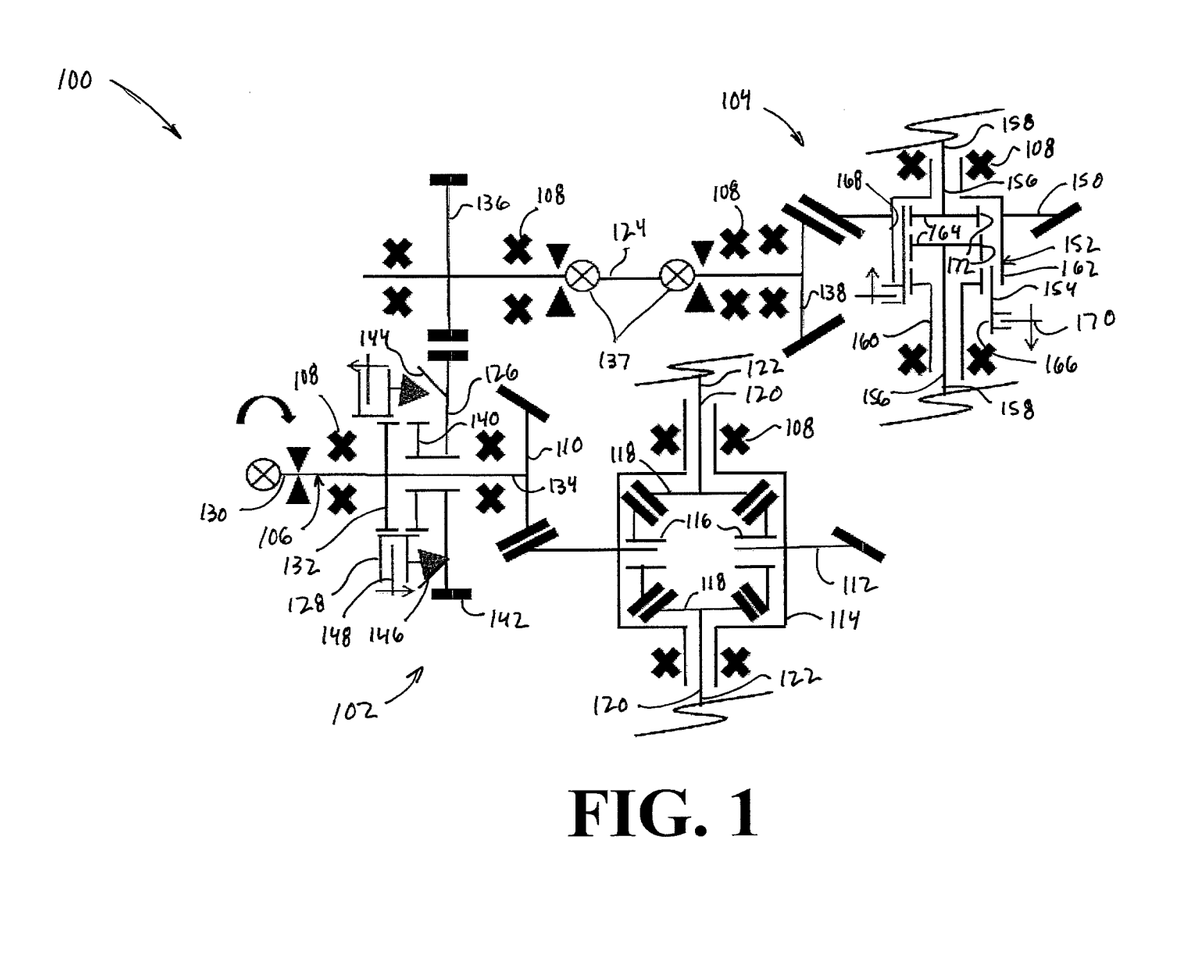
FIG. 1 is a schematic top view of a first embodiment of a tandem axle system.

FIG. 1 illustrates a tandem drive axle system 100 comprising a first axle assembly 102 and a second axle assembly 104. An input source of rotational energy (not shown) is provided to turn a first pinion shaft 106 of the first axle assembly 102. One or more bearings 108 may be located in contact with the first pinion shaft 106 to enable it to rotate within a first axle assembly housing (not shown). The first pinion shaft 106 has a first pinion gear 110 mounted thereto. The first pinion gear 110 has a toothed portion. The toothed portion is engaged with a toothed portion of a first axle driving gear 112, also located within the first axle assembly housing. The first pinion gear 110 may be such as a hypoid pinion gear. The first pinion shaft 106 is drivingly engaged with the first axle driving gear 112 of the first axle assembly 102 through a single gear mesh.

The first axle driving gear 112 is mounted on, or connected, to a first wheel differential case 114. At least two pinion gears 116 and at least two side gears 118 are located within the first wheel differential case 114. As known by those skilled in the art, the pinion gears 116 and the side gears 118 are connected to one another. The side gears 118 are also connected to axle half shafts 120. The axle half shafts 120 extend from the first wheel differential case 114 and the first axle assembly housing to a wheel end 122. The wheel ends 122 supports wheels and tires (not shown).

The first axle assembly 102 includes the first pinion shaft 106, a transfer shaft 124, a second output gear 126, and a shift collar 128. Preferably, the components 106, 124, 126, 128 are formed from a hardened steel, however the components 106, 124, 126, 128 may be formed from any other rigid material. As shown, the first axle assembly 102 includes the four components 106, 124, 126, 128 disposed in the first axle assembly housing but it is understood the first axle assembly 102 may include fewer or more components.

The first pinion shaft 106 is at least partially disposed in the first axle assembly housing. Preferably, the first pinion shaft 106 is an elongate cylindrical member; however the first pinion shaft 106 may be any other shape. The first pinion shaft 106 has a first end portion 130 drivingly engaged with the input source of rotational energy, a middle portion 132, and a second end portion 134 drivingly engaged with the first pinion gear 110.

The middle portion 132 is a radially extending flange having a set of clutch gear teeth formed thereon. The middle portion 132 is formed intermediate the first end portion 130 and the second end portion 134. Preferably, the set of clutch gear teeth is unitary with the first pinion shaft 106. However, it is understood that the set of clutch gear teeth may be formed in a collar that is splined to the first pinion shaft 106.

The transfer shaft 124 comprises at least one elongate cylindrical member drivingly engaged with the second output gear 126 through a driven gear 136 coupled to the transfer shaft 124. As illustrated, the transfer shaft 124 comprises a plurality of elongate cylindrical members connected by a pair of universal joints 137. Bearings 108 disposed between the transfer shaft 124 and the first axle assembly housing and a second axle assembly housing (not shown) permit the transfer shaft 124 to rotate therein. The transfer shaft 124 extends from within the first axle assembly to within the second axle assembly housing.

A second pinion gear 138 is drivingly coupled to the transfer shaft 124 opposite the driven gear 136. As is known in the art, the second pinion gear 138 has gear teeth formed on an outer surface thereof. The second pinion gear 138 may be one of a hypoid gear, a spiral bevel gear, a straight bevel gear, or any other gear known to those skilled in the art.

The second output gear 126 is a gear concentrically disposed about first pinion shaft 106. The second output gear 126 has a central perforation having a diameter greater than a diameter of the first pinion shaft 106. The second output gear 126 is a substantially disc shaped body having a first end portion 140, a second end portion 142 defining an outer diameter of the second output gear 126, and an engagement portion 144. Bearings (not shown) disposed between the first pinion shaft 106 and the second output gear 126 permit the second output gear 126 to rotate about an axis of the second output gear 126. The axis of the second output gear 126 is concurrent with the axis of the first pinion shaft 106. A first set of clutch gear teeth are formed on the first end portion 140 adjacent the set of clutch gear teeth of the middle portion 132 of the first pinion shaft 106. A second set of gear teeth are formed on the second end portion 142.

The engagement portion 144 is formed in the second output gear 126 intermediate the first end portion 140 and the second end portion 142. As shown, the engagement portion 144 is a conical surface oblique to the first pinion shaft 106; however, the engagement portion 144 may have any other shape.

The shift collar 128 is concentrically disposed about the first pinion shaft 106. The shift collar 128 includes a set of inner clutch collar teeth formed on an inner surface thereof and a first synchronizer ring 146. The set of inner clutch collar teeth are engaged with the set of clutch gear teeth of the middle portion 132. The shift collar 128 can be slidably moved along the axis of the first pinion shaft 106 as directed manually by an operator of the vehicle or automatically by an electronic control unit (not shown) while maintaining engagement of the inner clutch collar teeth and the set of clutch gear teeth of the middle portion. A shift fork 148 disposed in an annular recess formed in the shift collar 128 moves the shift collar 128 along the axis of the first pinion shaft 106 into a first position or a second position. A shift mechanism (not shown), which is drivingly engaged with the shift fork 148, is actuated to position the shift fork 148 as directed manually by an operator of the vehicle or automatically by the electronic control unit. Consequently, the shift fork 148 positions the shift collar 128 into the first position or the second position. In the first position, the shift collar 128 is only drivingly engaged with the set of clutch gear teeth of the middle portion 132. In the second position, the shift collar 128 is drivingly engaged with the set of clutch gear teeth of the middle portion 132 and the first set of clutch gear teeth of the first end portion 140 of the second output gear 126. It is understood the shift collar 128, the clutch gear teeth, the synchronizer ring 146, and the engagement portion 144 may be substituted with any clutching device that permits selective engagement of a driving and a driven part.

The first synchronizer ring 146 is an annular body coupled to the shift collar 128 adjacent the engagement portion 144 of the second output gear 126. The first synchronizer ring 146 has a first conical engagement surface. Alternately, the first synchronizer ring 146 may have an engagement surface having any other shape. A biasing member (not shown) is disposed between the shift collar 128 and the first synchronizer ring 146 to urge the first synchronizer ring 146 away from the shift collar 128. When the shift collar 128 is moved from the first position into the second position, the first conical engagement surface contacts the engagement portion 144 of the second output gear 126. As the shift collar 128 moves towards the first set of clutch gear teeth of the first end portion 140 of the second output gear 126, the biasing member is compressed while the shift collar 128 engages the set of clutch gear teeth of the middle portion 132 and before the shift collar 128 engages the first set of clutch gear teeth of the first end portion 140 of the second output gear 126.

The second axle assembly 104 includes a second axle driving gear 150, a second wheel differential case 152, a second shift collar 154, and a pair of second axle half shafts 156. Preferably, the components 150, 152, 154, 156 are formed from a hardened steel, however the components 150, 152, 154, 156 may be formed from any other rigid material. As shown, the second axle assembly 104 includes the four components 150, 152, 154, 156 disposed in the second axle assembly housing but it is understood the second axle assembly 104 may include fewer or more components.

The second axle driving gear 150 is mounted on, or connected, to the second wheel differential case 152. The second wheel differential case 152 may be drivingly engaged with the second axle half shafts 156 by engaging the second shift collar 154 with the second wheel differential case 152 and each of the second axle half shafts 156. The second axle half shafts 156 extend from the second wheel differential case 152 and the second axle assembly housing to a wheel end 158. The wheel ends 158 supports wheels and tires (not shown).

The second wheel differential case 152 comprises an inner portion 160 and an outer portion 162. The inner portion 160 is partially disposed within the outer portion 162. The inner portion 160 is drivingly engaged with the outer portion 162. The second shift collar 154 is disposed through at least one perforation formed in the second wheel differential case 152.

The inner portion 160 is a hollow annular member rotatably mounted with the second axle assembly housing at least one bearing 108. One of the second axle half shafts 156 is rotatably disposed through the inner portion 160. An end portion 164 includes a plurality of clutch teeth formed on an outer surface thereof for engaging corresponding clutch teeth formed on an inner surface 166 of the second shift collar 154.

The outer portion 162 is a hollow annular member rotatably mounted with the second axle assembly housing at least one bearing 108. One of the second axle half shafts 156 is rotatably disposed through the outer portion 160. An inner surface 168 of the second wheel differential housing 152 includes a plurality of clutch teeth formed thereon for engaging corresponding clutch teeth formed on an outer surface of the second shift collar 154. The second shift collar 154 is in sliding driving engagement with the inner surface 168 of the second wheel differential housing 152.

A second shift fork 170 disposed in an annular recess formed in the second shift collar 154 moves the second shift collar 154 along the axis of the second axle half shafts 156 into a first position or a second position. A shift mechanism (not shown), which is drivingly engaged with the second shift fork 170, is actuated to position the second shift fork 170 as directed manually by an operator of the vehicle or automatically by the electronic control unit. The second shift collar 154 can be slidably moved along the axis of the second axle half shafts 156 as directed manually by an operator of the vehicle or automatically by an electronic control unit (not shown) while maintaining engagement with the plurality of clutch teeth formed in the inner surface 168 while being engaged with the plurality of clutch teeth formed on a toothed outer surface 172 of the end portion 164. Consequently, the second shift fork 170 positions the second shift collar 154 into the first position or the second position. In the first position, the second shift collar 154 is only drivingly engaged with the inner surface 168. In the second position, the second shift collar 154 is drivingly engaged with the inner surface 168 and the toothed outer surface 172 of each of the second axle half shafts 156. When the second shift collar 154 is placed in the second position, each of the second axle half shafts 156 is drivingly engaged with the second axle driving gear 150. It is understood the second shift collar 154, the inner surface 168, and the second axle half shafts 156 may be substituted with any clutching device that permits selective engagement of a driving and a driven part.

Figure 2:
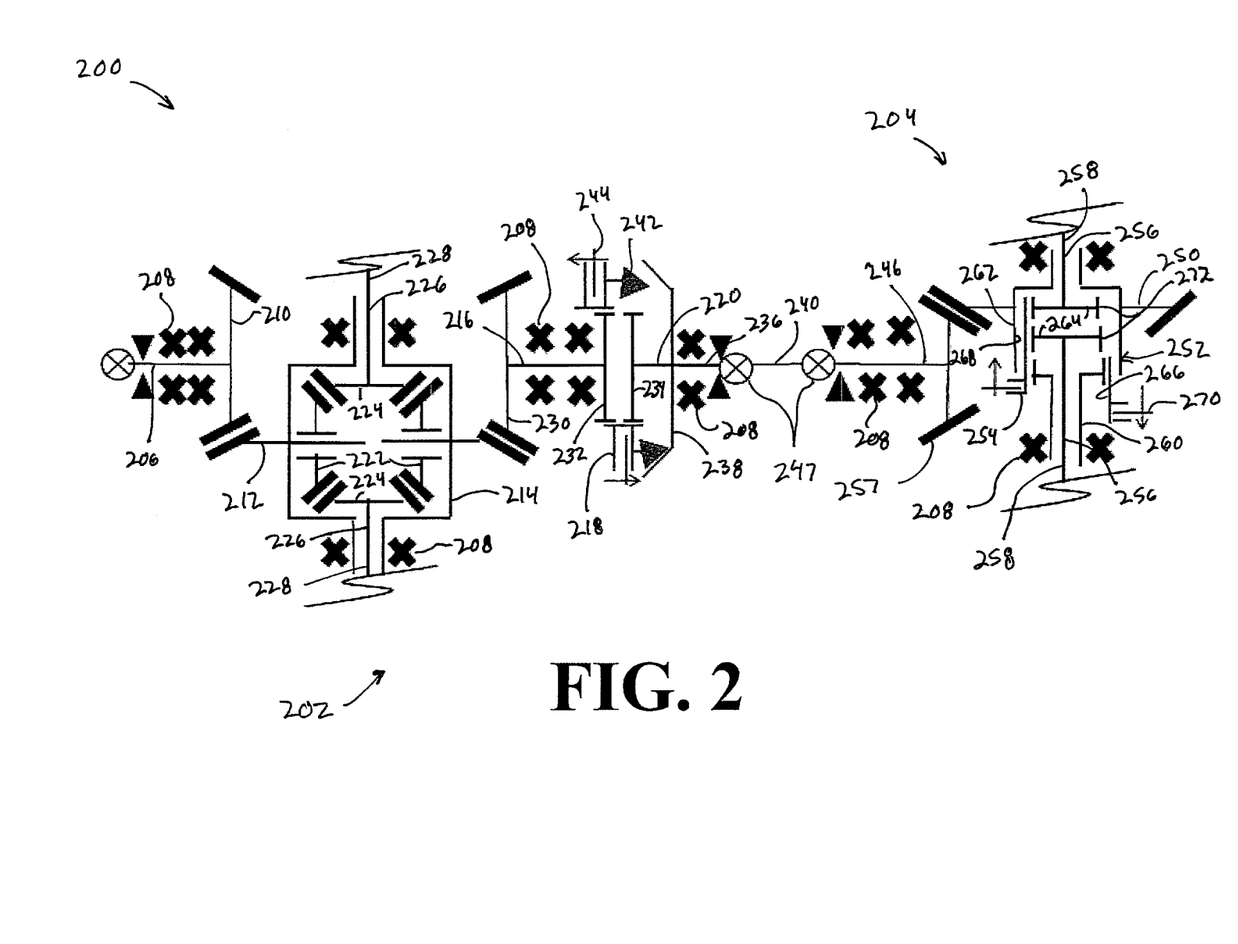
FIG. 2 is a schematic top view of a second embodiment of a tandem axle system.

FIG. 2 illustrates a tandem drive axle system 200 according to another embodiment of the invention. The tandem drive axle system 200 comprises a first axle assembly 202 and a second axle assembly 204. An input source of rotational energy (not shown) is provided to turn a first pinion shaft 206 of the first axle assembly 202. One or more bearings 208 may be located in contact with the first pinion shaft 206 to enable it to rotate within a first axle assembly housing (not shown). The first pinion shaft 206 has a first pinion gear 210 mounted thereto. The first pinion gear 210 has a toothed portion. The toothed portion is engaged with the forward side of a toothed portion of a first axle driving gear 212, also located within the first axle assembly housing. The first pinion gear 210 may be such as a hypoid pinion gear. The first pinion shaft 206 is drivingly engaged with the first axle driving gear 212 of the first axle assembly 202 through a single gear mesh.

The first axle assembly 202 includes the first pinion shaft 206, the first axle driving gear 212, a first wheel differential case 214, a second pinion shaft 216, a first shift collar 218, and an output shaft 220. Preferably, the components 206, 212, 214, 216, 218, and 220 are formed from a hardened steel, however the components 206, 212, 214, 216, 218, and 220 may be formed from any other rigid material. As shown, the first axle assembly 202 includes the six components 206, 212, 214, 216, 218, and 220 disposed in the first axle assembly housing but it is understood the first axle assembly 202 may include fewer or more components.

The first axle driving gear 212 is mounted on, or connected, to a first wheel differential case 214. At least two pinion gears 222 and at least two side gears 224 are located within the first wheel differential case 214. As known by those skilled in the art, the pinion gears 222 and the side gears 224 are connected to one another. The side gears 224 are also connected to axle half shafts 226. The axle half shafts 226 extend from the first wheel differential case 214 and the first axle assembly housing to a wheel end 228. The wheel ends 228 supports wheels and tires (not shown).

The second pinion shaft 216 is drivingly engaged with a rearward side of the toothed portion of the first axle driving gear 212. A second pinion gear 230 is mounted to the second pinion shaft 216. The second pinion shaft 216 is mounted using at least one bearing 208 to facilitate rotation of the second pinion shaft 216 within the first axle assembly housing. The second pinion gear 130 may be a hypoid pinion gear. The second pinion shaft 226 further comprises a toothed end portion 232 opposite the second pinion gear 230. The toothed end portion 232 is drivingly engaged with the first shift collar 218.

The output shaft 220 is an annular member at least partially disposed within the first axle assembly housing. The output shaft 220 has a first end portion 234, a second end portion 236, and an engagement portion 238. Bearings 208 disposed between the output shaft 220 and the first axle assembly housing permit the output shaft 220 to rotate about an axis of the output shaft 220. The axis of the output shaft 220 is concurrent with the axis of the second pinion shaft 216. A set of clutch gear teeth are formed on the first end portion 234 adjacent the toothed end portion 232 of the second pinion shaft 216. The second end portion 236 is drivingly engaged with an inter-axle shaft 240.

The engagement portion 238 is a radially extending portion of the output shaft 220 formed intermediate the first end portion 234 and the second end portion 236. As shown, the engagement portion 238 is a conical surface oblique to the output shaft 220; however, the engagement portion 238 may have any other shape.

The first shift collar 218 is concentrically disposed about the second pinion shaft 216. The first shift collar 218 includes a set of inner clutch collar teeth formed on an inner surface thereof and a synchronizer ring 242. The set of inner clutch collar teeth are engaged with the toothed end portion 232 of the second pinion shaft 216. The first shift collar 218 can be slidably moved along the axis of the second pinion shaft 216 as directed manually by an operator of the vehicle or automatically by an electronic control unit (not shown) while maintaining engagement of the inner clutch collar teeth and the toothed end portion 232 of the second pinion shaft 216. A shift fork 244 disposed in an annular recess formed in the first shift collar 218 moves the first shift collar 218 along the axis of the second pinion shaft 216 into a first position or a second position. A shift mechanism (not shown), which is drivingly engaged with the shift fork 244, is actuated to position the shift fork 244 as directed manually by an operator of the vehicle or automatically by the electronic control unit. Consequently, the shift fork 244 positions the first shift collar 218 into the first position or the second position. In the first position, the first shift collar 218 is only drivingly engaged with the toothed end portion 232 of the second pinion shaft 216. In the second position, the first shift collar 218 is drivingly engaged with the toothed end portion 232 of the second pinion shaft 216 and the first end portion 234 of the output shaft 220. It is understood the first shift collar 218, the toothed end portion 232, and the output shaft 220 may be substituted with any clutching device that permits selective engagement of a driving and a driven part.

The synchronizer ring 242 is an annular body coupled to the shift collar 218 adjacent the engagement portion 238 of the output shaft 220. The synchronizer ring 242 has a first conical engagement surface. Alternately, the synchronizer ring 242 may have an engagement surface having any other shape. A biasing member (not shown) is disposed between the shift collar 218 and the synchronizer ring 242 to urge the synchronizer ring 242 away from the shift collar 218. When the shift collar 218 is moved from the first position into the second position, the first conical engagement surface contacts the engagement portion 238 of the output shaft 220. As the shift collar 218 moves towards the set of clutch gear teeth formed on the first end portion 234 of the output shaft 220, the biasing member is compressed while the shift collar 218 engages the toothed end portion 232 of the second pinion shaft 216 and before the shift collar 218 engages the set of clutch gear teeth formed on the first end portion 234 of the output shaft 220.

The inter-axle shaft 240 comprises at least one elongate cylindrical member drivingly engaged with the output shaft 220 and a third pinion shaft 246. As illustrated, the inter-axle shaft 240 comprises an elongate cylindrical member having universal joints 247 disposed on each end. The inter-axle shaft 240 extends from adjacent the first axle assembly to adjacent the second axle assembly housing.

The second axle assembly 204 includes the third pinion shaft 246, a second axle driving gear 250, a second wheel differential case 252, a second shift collar 254, and a pair of second axle half shafts 256. Preferably, the components 246, 250, 252, 254, 256 are formed from a hardened steel, however the components 246, 250, 252, 254, 256 may be formed from any other rigid material. As shown, the second axle assembly 204 includes the five components 246, 250, 252, 254, 256 disposed in the second axle assembly housing but it is understood the second axle assembly 204 may include fewer or more components.

The third pinion shaft 246 is drivingly engaged with the inter-axle shaft 240 and the second axle driving gear 250. A third pinion gear 257 is mounted to the third pinion shaft 246. The third pinion shaft 246 is mounted using at least one bearing 208 to facilitate rotation of the third pinion shaft 246 within the second axle assembly housing. The third pinion gear 257 may be a hypoid pinion gear.

The second axle driving gear 250 is mounted on, or connected, to the second wheel differential case 252. The second wheel differential case 252 may be drivingly engaged with the second axle half shafts 256 by engaging the second shift collar 254 with the second wheel differential case 252 and each of the second axle half shafts 256. The second axle half shafts 256 extend from the second wheel differential case 252 and the second axle assembly housing to a wheel end 258. The wheel ends 258 supports wheels and tires (not shown).

The second wheel differential case 252 comprises an inner portion 260 and an outer portion 262. The inner portion 260 is partially disposed within the outer portion 262. The inner portion 260 is drivingly engaged with the outer portion 262. The second shift collar 254 is disposed through at least one perforation formed in the second wheel differential case 252.

The inner portion 260 is a hollow annular member rotatably mounted with the second axle assembly housing at least one bearing 208. One of the second axle half shafts 256 is rotatably disposed through the inner portion 260. An end portion 264 includes a plurality of clutch teeth formed on an outer surface thereof for engaging corresponding clutch teeth formed on an inner surface 266 of the second shift collar 254.

The outer portion 262 is a hollow annular member rotatably mounted with the second axle assembly housing at least one bearing 208. One of the second axle half shafts 256 is rotatably disposed through the outer portion 260. An inner surface 268 of the outer portion 262 includes a plurality of clutch teeth formed thereon for engaging corresponding clutch teeth formed on an outer surface of the second shift collar 254. The second shift collar 254 is in sliding driving engagement with the inner surface 268 of the second wheel differential case 252.

A second shift fork 270 disposed in an annular recess formed in the second shift collar 254 moves the second shift collar 254 along the axis of the second axle half shafts 256 into a first position or a second position. A shift mechanism (not shown), which is drivingly engaged with the second shift fork 270, is actuated to position the second shift fork 270 as directed manually by an operator of the vehicle or automatically by the electronic control unit. The second shift collar 254 can be slidably moved along the axis of the second axle half shafts 256 as directed manually by an operator of the vehicle or automatically by an electronic control unit (not shown) while maintaining engagement with the plurality of clutch teeth formed on the inner surface 268 while being engaged with the plurality of clutch teeth formed on a toothed outer surface 272 of the end portion 264. Consequently, the second shift fork 270 positions the second shift collar 254 into the first position or the second position. In the first position, the second shift collar 254 is only drivingly engaged with the inner surface 268. In the second position, the second shift collar 254 is drivingly engaged with the inner surface 268, and the toothed outer surface 272 of each of the second axle half shafts 256. When the second shift collar 254 is placed in the second position, each of the second axle half shafts 256 is drivingly engaged with the second axle driving gear 250. It is understood the second shift collar 254, the inner surface 268, and the second axle half shafts 256 may be substituted with any clutching device that permits selective engagement of a driving and a driven part.

Figure 3:
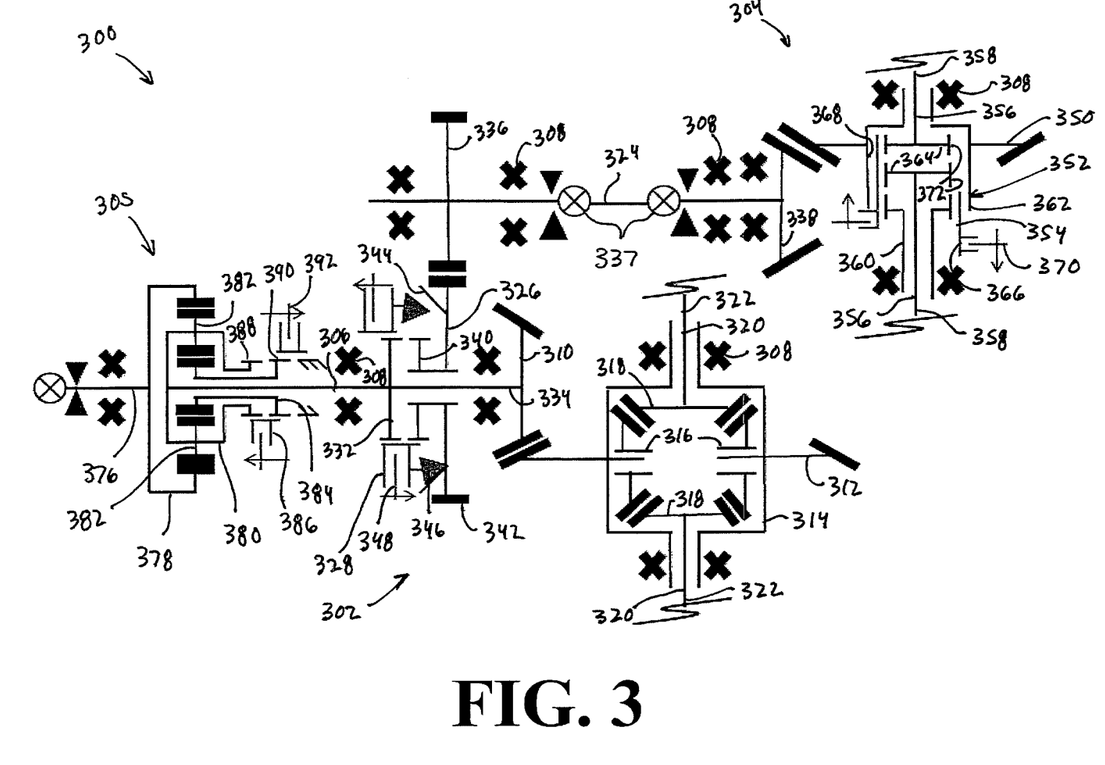
FIG. 3 is a schematic top view of a third embodiment of a tandem axle system.

FIG. 3 illustrates a tandem drive axle system 300 according to another embodiment of the invention. The embodiment shown in FIG. 3 includes similar components to the tandem drive axle system 100 illustrated in FIG. 1. Similar features of the embodiment shown in FIG. 3 are numbered similarly in series, with the exception of the features described below.

The tandem drive axle system 300 further comprises a planetary drive ratio adjuster 305. The planetary drive ratio adjuster 305 is in driving engagement with a planetary input shaft 376 and the first pinion shaft 306. An input source of rotational energy (not shown) is provided to turn the planetary input shaft 376. When placed in an engaged position, the planetary drive ratio adjuster 305 adjusts a drive ratio between the planetary input shaft 376 and the first pinion shaft 306.

The planetary drive ratio adjuster 305 comprises a ring gear member 378, a carrier member 380, a plurality of planet gears 382, a sun gear member 384, and an engagement collar 386. The planetary drive ratio adjuster 305 forms an epicyclic gearset.

The ring gear member 378 is an annular member drivingly engaged with the planetary input shaft 376 and each of the plurality of planet gears 382. It is understood that the ring gear member 378 may comprise a plurality of members coupled together or that the ring gear member 378 may be unitarily formed with the planetary input shaft 376. The ring gear member 378 comprises a plurality of gear teeth formed on an inner surface thereof that form a ring gear. The ring gear is drivingly engaged with each of the plurality of planet gears 382.

The carrier member 380 is an annular member drivingly engaged with the first pinion shaft 306 and having each of the plurality of planet gears 382 rotatably disposed thereon in an annular array. It is understood that the carrier member 380 may comprise a plurality of members coupled together or that the carrier member 380 may be unitarily formed with the first pinion shaft 306. The carrier member 380 includes a toothed engagement portion 388, disposed adjacent the engagement collar 386, which may be drivingly engaged therewith.

The plurality of planet gears 382 are gears rotatably disposed on the carrier member 380. Each of the planet gears 382 is drivingly engaged with the ring gear member 380 and the sun gear member 384. When the planetary drive ratio adjuster 305 is placed in the engaged position, each of the planet gears 382 are driven about the sun gear member 384, which drives the carrier member 380.

The sun gear member 384 is an annular member rotatably disposed about the first pinion shaft 306 and drivingly engaged with each of the plurality of planet gears 382. It is understood that the sun gear member 384 may comprise a plurality of members coupled together or that the sun gear member 384 may be unitarily formed with the first pinion shaft 306. The sun gear member 384 comprises a plurality of gear teeth formed on an outer surface thereof that form a sun gear. The sun gear is drivingly engaged with each of the plurality of planet gears 382. The sun gear member 384 includes a toothed engagement portion 390, disposed adjacent the engagement collar 386, which is drivingly engaged therewith.

The engagement collar 386 is concentrically disposed about a portion of the first pinion shaft 306. The engagement collar 386 includes a set of inner collar teeth formed on an inner surface thereof. The set of inner collar teeth may be engaged with a plurality of grounding teeth formed on a portion of a first axle assembly housing (not shown) or a member coupled thereto. The engagement collar 386 may be slidably moved along the axis of the first pinion shaft 306 as directed manually by an operator of the vehicle or automatically by an electronic control unit (not shown) while maintaining engagement with the plurality of grounding teeth formed on a portion of a first axle assembly housing and the toothed engagement portion 390 of the sun gear member 384. An adjuster shift fork 392 disposed in an annular recess formed in the engagement collar 386 moves the engagement collar 386 along the axis of the first pinion shaft 306 into the engaged position or the disengaged position. A shift mechanism (not shown), which is drivingly engaged with the adjuster shift fork 392, is actuated to position the adjuster shift fork 392 as directed manually by an operator of the vehicle or automatically by the electronic control unit. Consequently, the adjuster shift fork 392 positions the engagement collar 386 into the engaged position or the disengaged position. In the engaged position, the engagement collar 386 is drivingly engaged with plurality of grounding teeth formed on a portion of a first axle assembly housing and the toothed engagement portion 390 of the sun gear member 384, which fixes the sun gear member 384 and causes the carrier member 380 to be driven by the plurality of planet gears 382 in response to the ring gear member 378 being driven, resulting in the planetary input shaft 376 and the first pinion shaft 306 to be in a relative torque multiplication ratio. As a non-limiting example, the relative torque multiplication ratio may be 1.36:1; however, it is understood that other ratios may be used. In the disengaged position, the engagement collar 386 is drivingly engaged with the toothed engagement portion 390 of the sun gear member 384 and the toothed engagement portion 388 of the carrier member 380, which fixes the sun gear member 384 with respect to the carrier member 380 and causes the planetary drive ratio adjuster 305 to be placed in a "locked out" condition, resulting in the planetary input shaft 376 and the first pinion shaft 306 to be driven in a 1:1 drive ratio.

Figure 4:
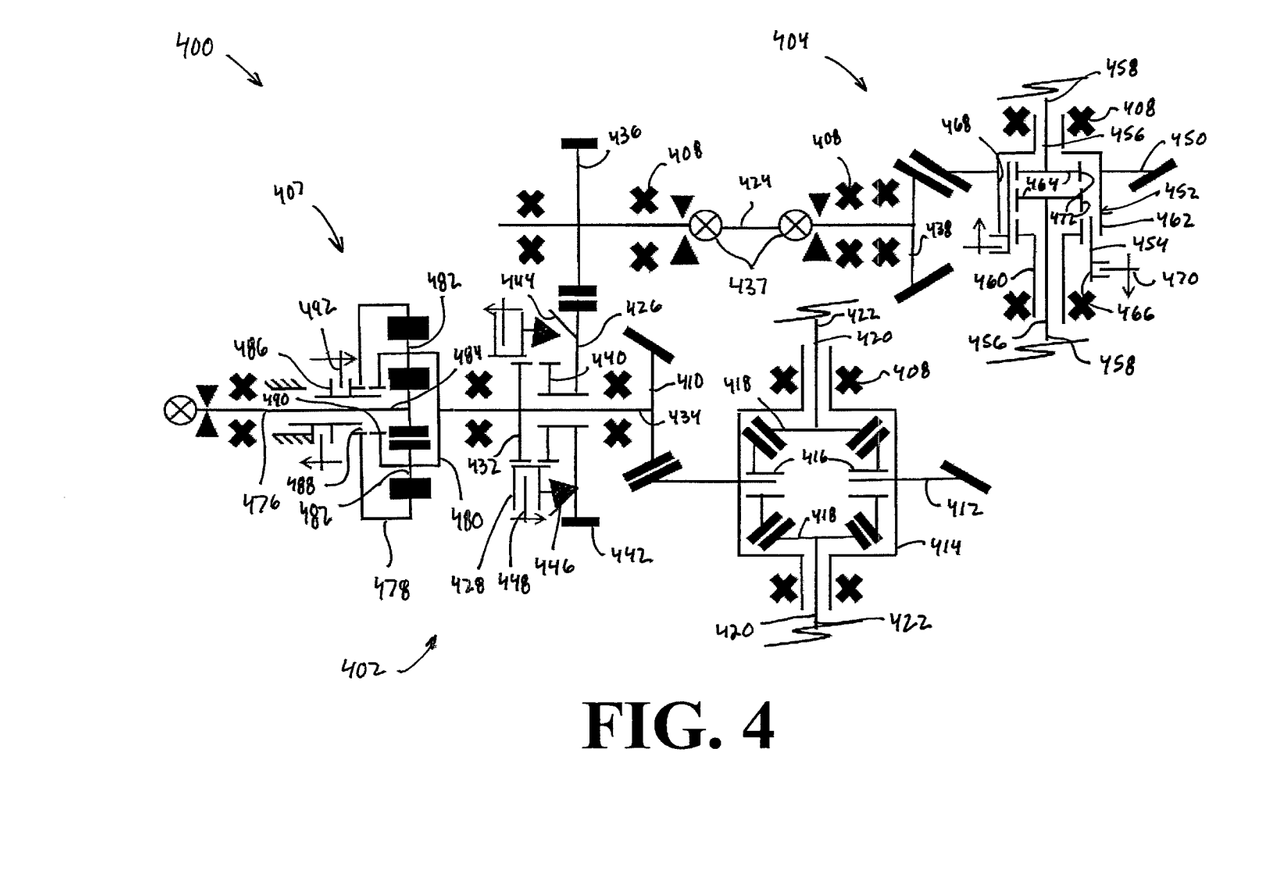
FIG. 4 is a schematic top view of a fourth embodiment of a tandem axle system.

FIG. 4 illustrates a portion of a tandem drive axle system 400 according to another embodiment of the invention. The embodiment shown in FIG. 4 includes similar components to the tandem drive axle system 100 illustrated in FIG. 1. Similar features of the embodiment shown in FIG. 4 are numbered similarly in series, with the exception of the features described below.

The tandem drive axle system 400 further comprises a planetary drive ratio adjuster 407. The planetary drive ratio adjuster 407 is in driving engagement with a planetary input shaft 476 and the first pinion shaft 406. An input source of rotational energy (not shown) is provided to turn the planetary input shaft 476. When placed in an engaged position, the planetary drive ratio adjuster 407 adjusts a drive ratio between the planetary input shaft 476 and the first pinion shaft 406.

The planetary drive ratio adjuster 407 comprises a ring gear member 478, a carrier member 480, a plurality of planet gears 482, a sun gear member 484, and an engagement collar 486. The planetary drive ratio adjuster 407 forms an epicyclic gearset.

The ring gear member 478 is an annular member rotatably disposed about the planetary input shaft 476 and drivingly engaged with each of the plurality of planet gears 482. It is understood that the ring gear member 478 may comprise a plurality of members coupled together or that the ring gear member 478 may be unitarily formed. The ring gear member 478 comprises a plurality of gear teeth formed on an inner surface thereof that form a ring gear. The ring gear is drivingly engaged with each of the plurality of planet gears 482. The ring gear member 478 includes a toothed engagement portion 488, disposed adjacent the engagement collar 486, which is drivingly engaged therewith.

The carrier member 480 is an annular member drivingly engaged with the first pinion shaft 406 and having each of the plurality of planet gears 482 rotatably disposed thereon in an annular array. It is understood that the carrier member 480 may comprise a plurality of members coupled together or that the carrier member 480 may be unitarily formed with the first pinion shaft 406. The carrier member 480 includes a toothed engagement portion 490, disposed adjacent the engagement collar 486, which may be drivingly engaged therewith.

The plurality of planet gears 482 are gears rotatably disposed on the carrier member 480. Each of the planet gears 482 is drivingly engaged with the ring gear member 480 and the sun gear member 484. When the planetary drive ratio adjuster 407 is placed in the engaged position, each of the planet gears 482 are driven by the sun gear member 484 about the ring gear member 478, which drives the carrier member 480.

The sun gear member 484 is an annular member drivingly engaged with the planetary input shaft 476 and each of the plurality of planet gears 482. It is understood that the sun gear member 484 may comprise a plurality of members coupled together or that the sun gear member 484 may be unitarily formed with the planetary input shaft 476. The sun gear member 484 comprises a plurality of gear teeth formed on an outer surface thereof that form a sun gear. The sun gear is drivingly engaged with each of the plurality of planet gears 482.

The engagement collar 486 is concentrically disposed about a portion of the planetary input shaft 476. The engagement collar 486 includes a set of outer collar teeth formed on an outer surface thereof. The set of outer collar teeth may be engaged with a plurality of grounding teeth formed on a portion of a first axle assembly housing (not shown) or a member coupled thereto. The engagement collar 486 may be slidably moved along the axis of the planetary input shaft 476 as directed manually by an operator of the vehicle or automatically by an electronic control unit (not shown) while maintaining engagement with the plurality of grounding teeth formed on a portion of a first axle assembly housing and the toothed engagement portion 488 of the ring gear member 478. An adjuster shift fork 492 disposed in an annular recess formed in the engagement collar 486 moves the engagement collar 486 along the axis of the planetary input shaft 476 into the engaged position or the disengaged position. A shift mechanism (not shown), which is drivingly engaged with the adjuster shift fork 492, is actuated to position the adjuster shift fork 492 as directed manually by an operator of the vehicle or automatically by the electronic control unit. Consequently, the adjuster shift fork 492 positions the engagement collar 486 into the engaged position or the disengaged position. In the engaged position, the engagement collar 486 is drivingly engaged with plurality of grounding teeth formed on a portion of a first axle assembly housing and the toothed engagement portion 488 of the ring gear member 478, which fixes the ring gear member 478 and causes the carrier member 480 to be driven by the plurality of planet gears 482 in response to the sun gear member 484 being driven, resulting in the planetary input shaft 476 and the first pinion shaft 434 to be in a relative torque multiplication ratio. As a non-limiting example, the relative torque multiplication ratio may be 4:1; however, it is understood that other ratios may be used. In the disengaged position, the engagement collar 486 is drivingly engaged with the toothed engagement portion 488 of the ring gear member 478 and the toothed engagement portion 490 of the carrier member 480, which fixes the ring gear member 478 with respect to the carrier member 480 and causes the planetary drive ratio adjuster 407 to be placed in a "locked out" condition, resulting in the planetary input shaft 476 and the first pinion shaft 406 to be driven in a 1:1 drive ratio.

Figure 5:
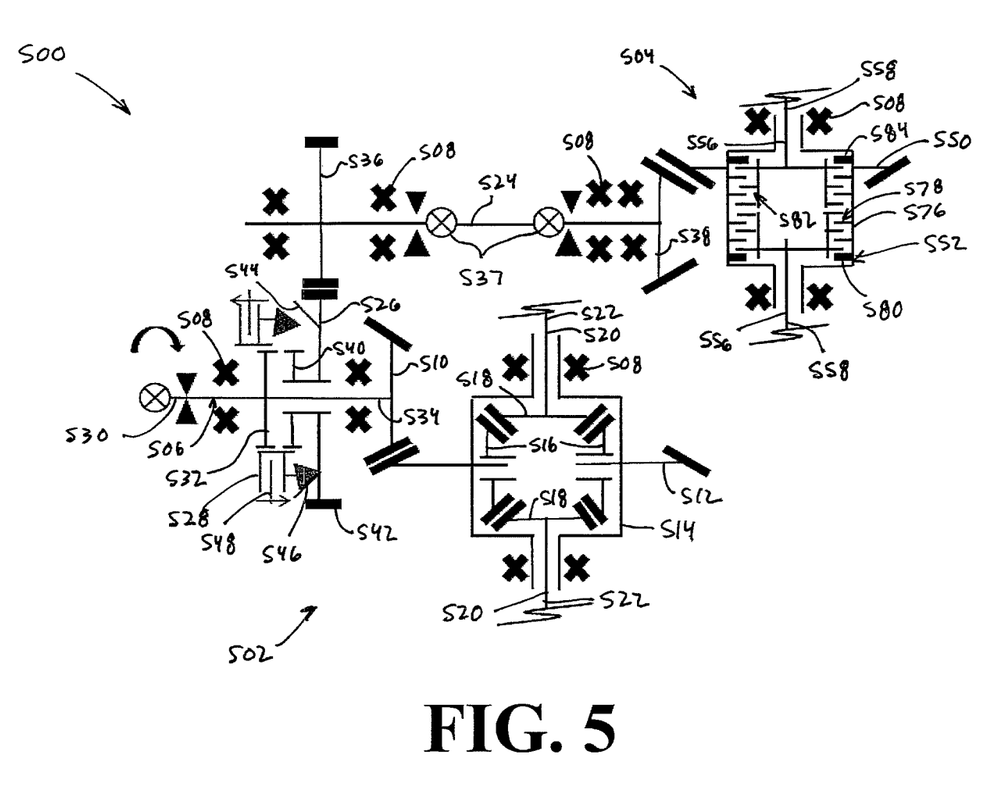
FIG. 5 is a schematic top view of a fifth embodiment of a tandem axle system.

FIG. 5 illustrates a portion of a tandem drive axle system 500 according to another embodiment of the invention. The embodiment shown in FIG. 5 includes similar components to the tandem drive axle system 100 illustrated in FIG. 1. Similar features of the embodiment shown in FIG. 5 are numbered similarly in series, with the exception of the features described below.

The tandem drive axle system 500 further comprises a plate clutch differential assembly 552, which is in driving engagement with the second axle driving gear 550. The plate clutch differential assembly 552 comprises a housing 576, a first set of intermeshed plates 578, a first actuator 580, a second set of intermeshed plates 582, and a second actuator 584. The first set of intermeshed plates 578, the first actuator 580, the second set of intermeshed plates 582, and the second actuator 584 are disposed within the housing 576 and facilitate driving engagement between the housing 576 and the second axle half shafts 556.

The housing 576 is a hollow, annular member disposed within the second axle assembly housing (not shown) and rotatably supported using at least a pair of bearings 508. The housing 576 comprises a plurality of members coupled together in any conventional manner. The housing 576 has a splined inner surface which at least a portion of the intermeshed plates 578, 582 are drivingly engaged with.

The first set of intermeshed plates 578 comprises a first plurality of plates drivingly engaged with the housing 576 intermeshed with a second plurality of plates drivingly engaged with a splined outer surface of one of the second axle half shafts 556.

The first actuator 580 is an annular actuator disposed within the housing 576. When engaged by a controller (not shown), the first actuator 580 applies a force to the first set of intermeshed plates 578, causing driving engagement to occur between the housing 576 and one of the second axle half shafts 556. The first actuator 580 may be hydraulically, pneumatically, electronically, or mechanically actuated by the controller.

The second set of intermeshed plates 582 comprises a first plurality of plates drivingly engaged with the housing 576 intermeshed with a second plurality of plates drivingly engaged with a splined outer surface of a remaining one of the second axle half shafts 556.

The second actuator 584 is an annular actuator disposed within the housing 576. When engaged by the controller, the second actuator 584 applies a force to the second set of intermeshed plates 582, causing driving engagement to occur between the housing 576 and the remaining one of the second axle half shafts 556. The second actuator 584 may be hydraulically, pneumatically, electronically, or mechanically actuated by the controller. Further, it is understood that the plate clutch differential assembly 552 may comprise a single set of clutch plates and a single actuator or that the first actuator 580 and the second actuator 584 may be actuated independently of one another to facilitate a differential function.

In use, the tandem axle drive system 100, 200, 300, 400, 500 facilitates use of the first axle assembly 102, 202, 302, 402, 502 for a full time drive duty cycle and the second axle assembly 104, 204, 304, 404, 504 may be sized for intermittent use under low traction conditions. When a vehicle (not shown) the tandem axle drive system 100, 200, 300, 400, 500 is incorporated in is not operating in the low traction conditions, and the second axle assembly 104, 204, 304, 404, 504 is drivingly disengaged from the first axle assembly 102, 202, 302, 402, 502 and allowed to idle. The components of the second axle assembly 104, 204, 304, 404, 504 can be sized based on to a limited duty cycle of the second axle assembly 104, 204, 304, 404, 504, which reduces a cost and a weight of the tandem axle drive system 100, 200, 300, 400, 500.

The tandem axle drive system 100, 200, 300, 400, 500 allows an inter-axle differential and an axle wheel differential, which are common among tandem axle drive systems, to be eliminated, which further reduces the cost and the weight of the tandem axle drive system 100, 200, 300, 400, 500. The inter-axle differential and the axle wheel differential may be eliminated because the second axle assembly 104, 204, 304, 404, 504 is only engaged when the low traction conditions are present. The use of the shift collars 128, 154, 218, 254, 328, 354, 428, 454, 528 and the plate clutch differential assembly 552 allow for the second axle assembly 104, 204, 304, 404, 504 to be simply drivingly engaged or drivingly disengaged from the first axle assembly 102, 202, 302, 402, 502. The second shift collar 154, 254, 354, 454 is used to drivingly engage the second axle half shafts 156, 256, 356, 456 with the second axle driving gear 150, 250, 350, 450 when the second shift collar 154, 254, 354, 454 is placed into an engaged position. The second shift collar 154, 254, 354, 454 disengages the second axle half shafts 156, 256, 356, 456 from the second axle driving gear 150, 250, 350, 450 when the second shift collar 154, 254, 354, 454 is placed into an disengaged position, allowing the second axle assembly 104, 204, 304, 404 to be placed in an idle mode without the need for a differential lock function, as the second axle assembly 104, 204, 304, 404 does not include a differential.

Further, it is understood that the tandem axle drive system 100, 200, 300, 400, 500 may incorporate synchronizers to facilitate engagement of the second axle assembly 104, 204, 304, 404, 504. A single synchronizer or an overrunning clutch may be used to engage the second axle assembly 104, 204, 304, 404, 504 with the first axle assembly 102, 202, 302, 402, 502 without the need for an inter-axle differential lock function, as an inter-axle differential is not used.

It is also understood that the second axle assembly 104, 204, 304, 404, 504 may be drivingly engaged without interaction from the operator of the vehicle or without interfering with operation of the vehicle in response to a detected wheel slip of one of the wheels drivingly engaged with the first axle assembly 102, 202, 302, 402, 502.

The first axle assembly 102 of the tandem drive axle system 100 includes a helical gear drive paired with one of a synchronizer and an overrunning clutch to facilitate driving engagement with the second axle assembly 104. When the second axle assembly 104 is in an idle mode, the shift collar 128 is partially engaged to "spool up" the second axle assembly 104 before drivingly engaging the second axle assembly 104 with the first axle assembly 102.

The first axle assembly 202 of the tandem drive axle system 200 eliminates the helical gearing and instead employs the second pinion shaft 216 in driving engagement with the first axle driving gear 212 as a power takeoff. When the second axle assembly 204 is in an idle mode, the shift collar 218 is partially engaged to "spool up" the second axle assembly 204 before drivingly engaging the second axle assembly 204 with the first axle assembly 202.

The first axle assembly 302 of the tandem drive axle system 300 includes the planetary drive ratio adjuster 305, which reduces a rotational speed of the first pinion shaft 306 when engaged to increase an amount of torque applied thereto. The planetary drive ratio adjuster 305 may be engaged automatically or manually, regardless of an engagement status of the second axle assembly 304.

The first axle assembly 502 of the tandem drive axle system 500 includes the plate clutch differential assembly 552. The plate clutch differential assembly 552 can be used to provide a torque vectoring function and/or to limit an amount of torque applied to the second axle shafts 556.

Figure 6:
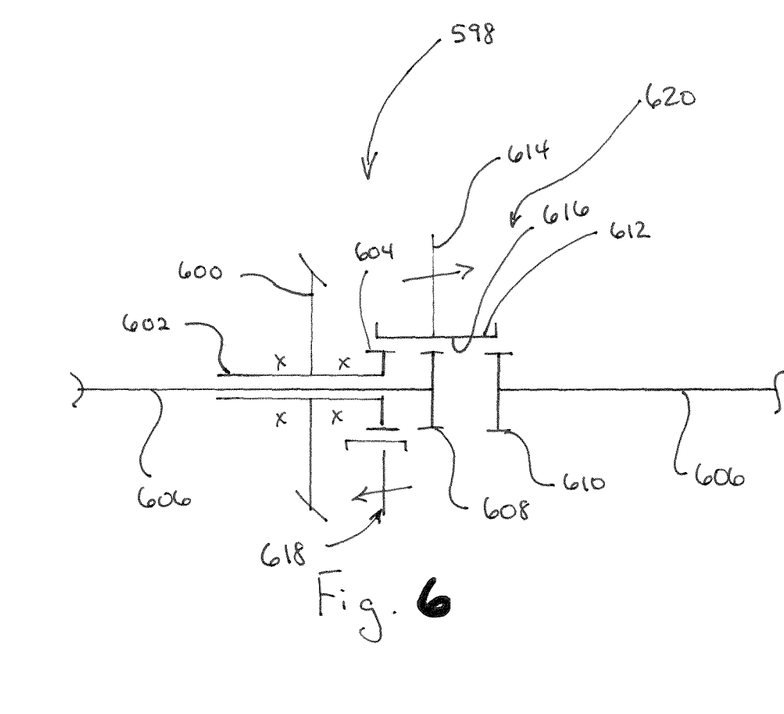
FIG. 6 is a schematic top view of one embodiment of a rear tandem axle system.

Turning now to FIG. 6, another embodiment of a second axle assembly 598 is depicted. A second axle driving gear 600 is depicted connected to a differential case 602. The differential case 602 has a first set of teeth 604. The second axle assembly 598 also has two second axle half shafts 606 extending into the differential case 602. Each inboard end of each second axle half shaft has a set of teeth 608, 610 thereon.

A second shift collar 612 is provided with a set of inner teeth 616 thereon. The second shift collar 612 is selectively moved between teeth 604, 608 and 610 by a shift fork 614. In a first position 618, the inner teeth 616 are engaged only with teeth 604. In the first position, the second axle half shafts 606 are not drivingly connected to the shift collar 612, and they are free rotate with respect to one another and the shift collar 612. In a second position 620, the second shift collar 612 slides into engagement with teeth 604, 608 and 610 to lock them into common rotation.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A tandem axle system, comprising:
 a forward rear tandem axle;
 a rear rear tandem axle;
 a transfer shaft located between said forward rear tandem axle and said rear rear tandem axle;
 a mechanism for selectively engaging and disengaging said transfer shaft;
 a rear case having an inner portion and an outer portion, a first axle half shaft and a second axle half shaft extending from said rear case wherein said first axle half shaft has a first set of teeth located within said inner portion of said rear case and said second axle half shaft has a second set of teeth located within said inner portion of said rear case, wherein said inner portion of said rear case has a set of teeth; and
 a single clutch collar slidable within said inner portion of said rear case, said clutch collar having inner teeth on an inner surface of said collar and outer teeth on an outer surface of said clutch collar wherein said inner teeth selectively engage with said first axle half shaft teeth and said second axle half shaft teeth and said outer teeth selectively engage with first set of teeth on said rear case;
 wherein said rear case does not have a differential.

2. The tandem axle system of claim 1, wherein said clutch collar has a first position where said collar is only engaged with the inner portion of the rear case.

3. The tandem axle system of claim 1, wherein said clutch collar has a second position where said collar is engaged with the inner portion of the rear case and each of said axle half shafts.

4. The tandem axle system of claim 3, wherein in the second position the axle half shafts are engaged with a ring gear connected to said rear case.

5. The tandem axle system of claim 1, wherein said forward rear tandem axle has a first pinion shaft with a middle portion bearing a toothed radially extending flange, wherein an output gear and a forward shift collar are concentrically disposed about said first pinion shaft, wherein said forward shift collar selectively engages said toothed radially extending flange and said output gear.

6. The tandem axle system of claim 1, wherein said forward rear tandem axle comprises a first pinion shaft driving a first pinion which drives a ring gear connected to both a forward differential and a second pinion.

7. The tandem axle system of claim 6, wherein said second pinion is connected to a second pinion shaft, wherein a shift collar selectively engages a toothed end of said second pinion shaft and a set of clutch gear teeth on an output shaft sharing the same axis as the second pinion shaft.

8. The tandem axle system of claim 1, wherein said forward rear tandem axle is comprised of a planetary drive ratio adjuster for adjusting a drive ratio between a planetary input shaft and a first pinion shaft, said planetary drive ratio adjuster comprising planet gears, a ring gear member, a carrier member, a sun gear member and an engagement collar.

9. The tandem axle system of claim 8, wherein in a first position said engagement collar fixed said sun gear ember and causes the carrier member to be driven by the planet gears resulting in the planetary input shaft and the first pinion shaft to be in a relative torque multiplication ratio.

10. The tandem axle system of claim 9, wherein said forward rear tandem axle has a first pinion shaft with a middle portion bearing a toothed radially extending flange, wherein an output gear and a forward shift collar are concentrically disposed about said first pinion shaft, wherein said forward shift collar selectively engages said toothed radially extending flange and said output gear.

11. A tandem axle system, comprising:
 a forward rear tandem axle;
 a rear rear tandem axle;
 a transfer shaft located between said forward rear tandem axle and said rear rear tandem axle;
 a mechanism for selectively engaging and disengaging said transfer shaft;
 a rear case, a first axle half shaft and a second axle half shaft extending from said rear case wherein said first axle half shaft has a first set of teeth and said second axle half shaft has a second set of teeth, wherein rear case has a third set of teeth; and
 a single clutch collar having teeth on a surface of said collar wherein said clutch collar teeth selectively engage with said first axle half shaft teeth and said second axle half shaft teeth and said clutch collar teeth selectively engage with said third set of teeth on said rear case;
 wherein said rear case does not have a differential.

* * * * *